United States Patent
Dasgupta

(10) Patent No.: US 8,280,816 B2
(45) Date of Patent: Oct. 2, 2012

(54) MANAGING SECURITY FOR NETWORK-BASED GAMING

(75) Inventor: Ranjan Dasgupta, Naperville, IL (US)

(73) Assignee: WMS Gaming Inc., Waukegan, IL (US)

(*) Notice: Subject to any disclaimer, the term of this patent is extended or adjusted under 35 U.S.C. 154(b) by 722 days.

(21) Appl. No.: 12/373,160

(22) PCT Filed: Jul. 10, 2007

(86) PCT No.: PCT/US2007/015711
§ 371 (c)(1),
(2), (4) Date: Aug. 11, 2009

(87) PCT Pub. No.: WO2008/008325
PCT Pub. Date: Jan. 17, 2008

(65) Prior Publication Data
US 2010/0130287 A1    May 27, 2010

Related U.S. Application Data

(60) Provisional application No. 60/806,889, filed on Jul. 10, 2006, provisional application No. 60/889,690, filed on Feb. 13, 2007.

(51) Int. Cl.
*G06F 21/00* (2006.01)
(52) U.S. Cl. .......................................... 705/56; 705/59
(58) Field of Classification Search .................... 705/56; 273/237, 274; 902/23
See application file for complete search history.

(56) References Cited

U.S. PATENT DOCUMENTS

| | | | |
|---|---|---|---|
| 6,591,376 B1* | 7/2003 | VanRooven et al. | 714/36 |
| 6,863,612 B2 | 3/2005 | Willis | |
| 7,330,967 B1* | 2/2008 | Pujare et al. | 713/2 |
| 7,565,495 B2* | 7/2009 | Kleinschnitz et al. | 711/154 |
| 7,577,722 B1* | 8/2009 | Khandekar et al. | 709/220 |
| 8,043,160 B2* | 10/2011 | Dasgupta | 463/42 |

(Continued)

FOREIGN PATENT DOCUMENTS

WO    WO2006/116676 A2 * 11/2006

(Continued)

OTHER PUBLICATIONS

"How to: Mount an ISO image under Linux", cyberciti.biz, Mar. 29, 2004, all pages. http://www.cyberciti.biz/tips/how-to-mount-iso-image-under-linux.html.*

(Continued)

*Primary Examiner* — James A Reagan
*Assistant Examiner* — Calvin Cheung
(74) *Attorney, Agent, or Firm* — Schwegman Lundberg & Woessner, P.A.

(57) ABSTRACT

This document discusses, among other things, systems and methods for managing security for network-based gaming. A method and system download and install an image of wagering game content on a wagering game machine, wherein the wagering game machine is capable of receiving a wager input from a player. The image is validated and may be transformed to a virtual storage device, such that it appears to be a physical storage device. The files may be accessed and validated in a similar manner as if they were stored on a physical storage device. In some cases, the same image format for content in an image is the same as if the content was stored on a physical storage device.

14 Claims, 13 Drawing Sheets

U.S. PATENT DOCUMENTS

| | | | |
|---|---|---|---|
| 8,075,395 B2* | 12/2011 | Sylla | 463/29 |
| 2002/0049909 A1 | 4/2002 | Jackson et al. | |
| 2002/0057800 A1 | 5/2002 | Gordon et al. | |
| 2002/0188940 A1* | 12/2002 | Breckner et al. | 717/175 |
| 2002/0194394 A1* | 12/2002 | Chan | 709/319 |
| 2002/0196940 A1* | 12/2002 | Isaacson et al. | 380/227 |
| 2003/0064771 A1 | 4/2003 | Morrow et al. | |
| 2003/0070043 A1* | 4/2003 | Merkey | 711/114 |
| 2003/0130027 A1 | 7/2003 | Aida | |
| 2004/0224777 A1 | 11/2004 | Smith et al. | |
| 2006/0035713 A1* | 2/2006 | Cockerille et al. | 463/42 |
| 2006/0080385 A1* | 4/2006 | Blandford et al. | 709/203 |
| 2006/0080522 A1* | 4/2006 | Button et al. | 713/2 |
| 2006/0173985 A1 | 8/2006 | Moore | |
| 2006/0264256 A1 | 11/2006 | Gagner et al. | |
| 2007/0168905 A1* | 7/2007 | Bromley et al. | 717/100 |
| 2007/0276916 A1* | 11/2007 | McLoughlin et al. | 709/208 |
| 2008/0220848 A1 | 9/2008 | Adiraju et al. | |
| 2008/0222234 A1* | 9/2008 | Marchand | 709/201 |

FOREIGN PATENT DOCUMENTS

| | | |
|---|---|---|
| WO | WO-2007011636 A2 | 1/2007 |
| WO | WO-2007011636 A3 | 1/2007 |
| WO | WO-2007133468 A2 | 11/2007 |
| WO | WO-2007133468 A3 | 11/2007 |

OTHER PUBLICATIONS

"How to mount partitions and file systems in Linux", tuxfiles.org, Aug. 3, 2003, all pages. http://web.archive.org/web/20030803151901/http://www.tuxfiles.org/linuxhelp/mounting.html.*

"Linux directory structure", tuxfiles.org, Aug. 6, 2003, all pages. http://web.archive.org/web/20030806114936/http://www.tuxfiles.org/linuxhelp/linuxdir.html.*

Negus, C., LinuxBible: Boot Up to Fedora, Knoppix, Debian, Suse, Ubuntu, and 7 Other Distributions. Wiley, Feb. 6, 2006, all pages.*

"Norton Ghost", Symantec Corp., all pages, 2008. ftp://ftp.symantec.com/public/english_us_canada/products/ghost/14/manuals/ngh_14_user_guide.pdf.*

"International Application Serial No. PCT/US07/10740,Search Report and Written Opinion mailed Aug. 12, 2008", 9 pgs.

"International Application Serial No. PCT/US2007/015711, Search Report and Written Opinion mailed on Aug. 27, 2008", 13 pgs.

* cited by examiner

MANAGING SECURITY FOR NETWORK-BASED GAMING

RELATED APPLICATIONS

This patent application is a U.S. National Stage Filing under 35 U.S.C. 371 from International Patent Application Serial No. PCT/US2007/015711, filed Jul. 10, 2007, and published on Jan. 17, 2008 as WO 2008/008325 A2 and republished as WO 2008/008325 A3, which claims the priority benefit of U.S. Provisional Patent Application Ser. No. 60/806,889 filed Jul. 10, 2006 entitled "SYSTEMS, METHODS AND SOFTWARE FOR NETWORK-BASED GAMING" and U.S. Provisional Patent Application Ser. No. 60/889,690 filed Feb. 13, 2007 entitled "SYSTEMS, METHODS AND SOFTWARE FOR NETWORK-BASED GAMING", the contents of which are incorporated herein by reference in their entirety.

The following commonly assigned U.S. patent application is related, and is herein incorporated by reference in its entirety: U.S. Provisional Patent Application Ser. No. 60/746,674, filed on May 8, 2006, and entitled "DOWNLOADABLE OPERATING SYSTEM FOR WAGERING GAMING SYSTEMS,".

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, WMS Gaming, Inc.

TECHNICAL FIELD

This application relates generally to wagering games and more particularly to methods and apparatus for managing security for networked-based gaming.

BACKGROUND

In the gaming industry maintaining the security and integrity of electronic gaming machines is of paramount concern to regulators and players. To this end, some stand-alone computer-based gaming machines include specially-designed security architectures.

BRIEF DESCRIPTION OF THE FIGURES

The present inventive subject matter is illustrated by way of example and not limitation in the Figures of the accompanying drawings in which.

DETAILED DESCRIPTION

In the following detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the inventive subject matter, its elements, operation, and application are not limiting as a whole, but serve only to define these example embodiments. The following detailed description does not, therefore, limit embodiments of the inventive subject matter, which are defined only by the appended claims.

Figure 1A:
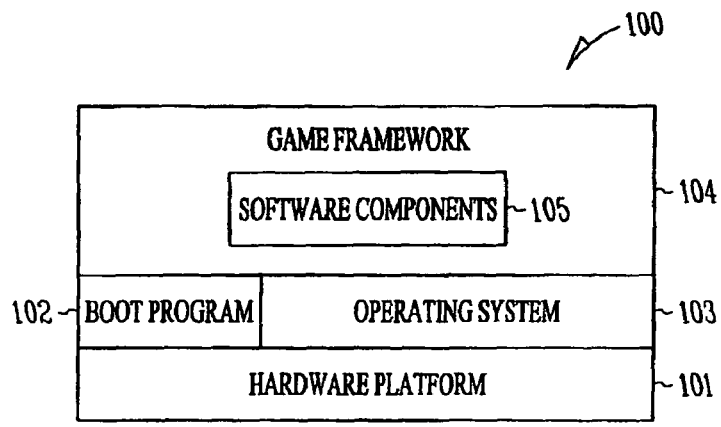
FIG. 1A illustrates a block diagram of an architecture for a wagering game machine according to example embodiments of the inventive subject matter described herein.

Referring now to FIG. 1A, there is illustrated a block diagram of an architecture for a wagering game machine 100, according to example embodiments of the inventive subject matter. The wagering game machine 100 may be used in gaming establishments, such as casinos. According to some example embodiments, the wagering game machine 100 can be any type of wagering game machine and can have varying structures and methods of operation. For example, the wagering game machine 100 can be an electromechanical wagering game machine configured to play mechanical slots, or it can be an electronic wagering game machine configured to play video casino games, such as blackjack, slots, keno, poker, blackjack, roulette, etc. As shown in FIG. 1A, the wagering game architecture includes a hardware platform 101, a boot program 102, an operating system 103, and a game framework 104 that includes one or more wagering game software components 105. According to one example embodiment, the game software components 105 include the software components of the gaming system 100, including but not limited to the wagering game software. According to another example embodiment, one or more of the software components 105 of the gaming system 100 may be provided as part of the operating system 103 or other software used in the wagering game system 100. Game framework 104 may also include standardized game software components, and game software components that are unique for a particular wagering game. In one example embodiment, the wagering game software components 105 may include software operative in connection with the hardware platform 101 and operating system 103 to present wagering games, such as video poker, video black jack, video slots, video lottery, etc., in whole or part. According to another example embodiment, the software components 105 may include software operative to accept a wager from a player. Further, in one example embodiment, boot program 104, operating system 103, game framework 104 and gaming software components 105 may be stored in a read-only compact flash (CF) device (such as device 132 described below) and digitally signed so as to insure their integrity. This content may be opened and verified in an order and manner that insures that only trusted content is allowed to execute on the wagering game machine 100.

Figure 1B:
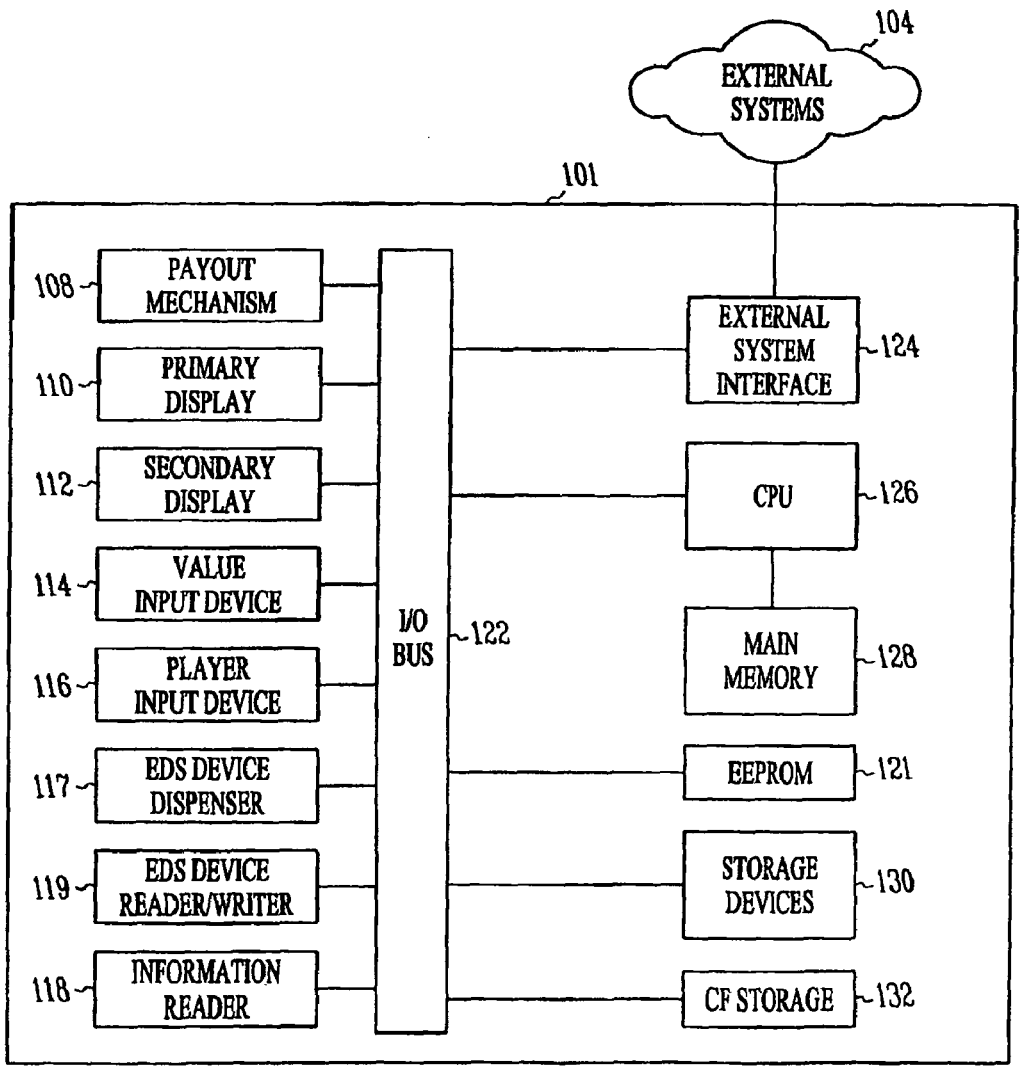
FIG. 1B illustrates a wagering game machine hardware platform according to one example embodiment of the inventive subject matter described herein.

Referring now to FIG. 1B, an example embodiment of a wagering game machine hardware platform 101 is described. Platform 101 may include a central processing unit (CPU) 126 connected to a main memory 128, which may be any type of addressable memory or storage. The CPU 126 is also connected to an input/output (I/O) bus 122, which facilitates communication between the wagering game machine's components. The I/O bus 122 may be connected to a payout mechanism 108, primary display 110, secondary display 112, value input device 114, player input device 116, information reader 118, electronic data storage (EDS) media dispenser 117, electronic data storage media reader/writer 119, an electrically erasable programmable read only memory (EEPROM) 121, and compact flash (CF) storage device 132, and other storage devices 130. According to one example embodiment, the value input device 114 is a world bill acceptor (WBA) bill validator, and the value output device (not shown) includes a printer capable of printing bar coded tickets. In another embodiment, EDS media dispenser 117 and EDS media reader/writer 119 are not included in wagering game machine 100. In some embodiments, EDS media dispenser 117 dispenses an EDS device (not shown), for example a RFID storage device such as a Wicket™ or a smart card. EDS media reader/writer 119 may include devices such as an RFID interrogator that includes an antenna packaged with a transceiver and decoder. The RFID interrogator may emit a signal activating the RFID circuits in the EDS media (e.g., RFID media or smart card), so it can read and write data to it. Storage devices 130 may include any type of storage device including but not limited to magnetic storage media, CD-ROM, RAMdisk, a compact flash (CF) memory device, firmware or random access memory (RAM). The player input device 116 can include the value input device 114 to the extent the player input device 116 is used to place wagers. The I/O bus 122 is also connected to an external system interface 124, which is connected to external systems 104 (e.g., wagering game networks). In one embodiment, the wagering game machine hardware platform 101 can include additional peripheral devices and/or more than one of each component shown in FIG. 1B. For example, in one embodiment, the wagering game machine hardware platform 101 can include multiple external system interfaces 124 and multiple CPUs 126. In one embodiment, any of the components can be integrated or subdivided. Additionally, in one embodiment, the components of the wagering game machine hardware platform 101 can be interconnected according to any suitable interconnection architecture (e.g., directly connected, hypercube, etc.).

In one embodiment, any of the wagering game software components 105 of the wagering game machine 100 may be stored and executed from any machine readable media provided in or accessed by the hardware platform 101, including for example storage devices 130 or memory 128. For example, in one embodiment at least some of the wagering game software components 105 are stored in the storage devices 130 at least some of the time, and the same or others of the software components 105 are loaded and accessed from the main memory 128 at least some of the time.

Figure 1C:
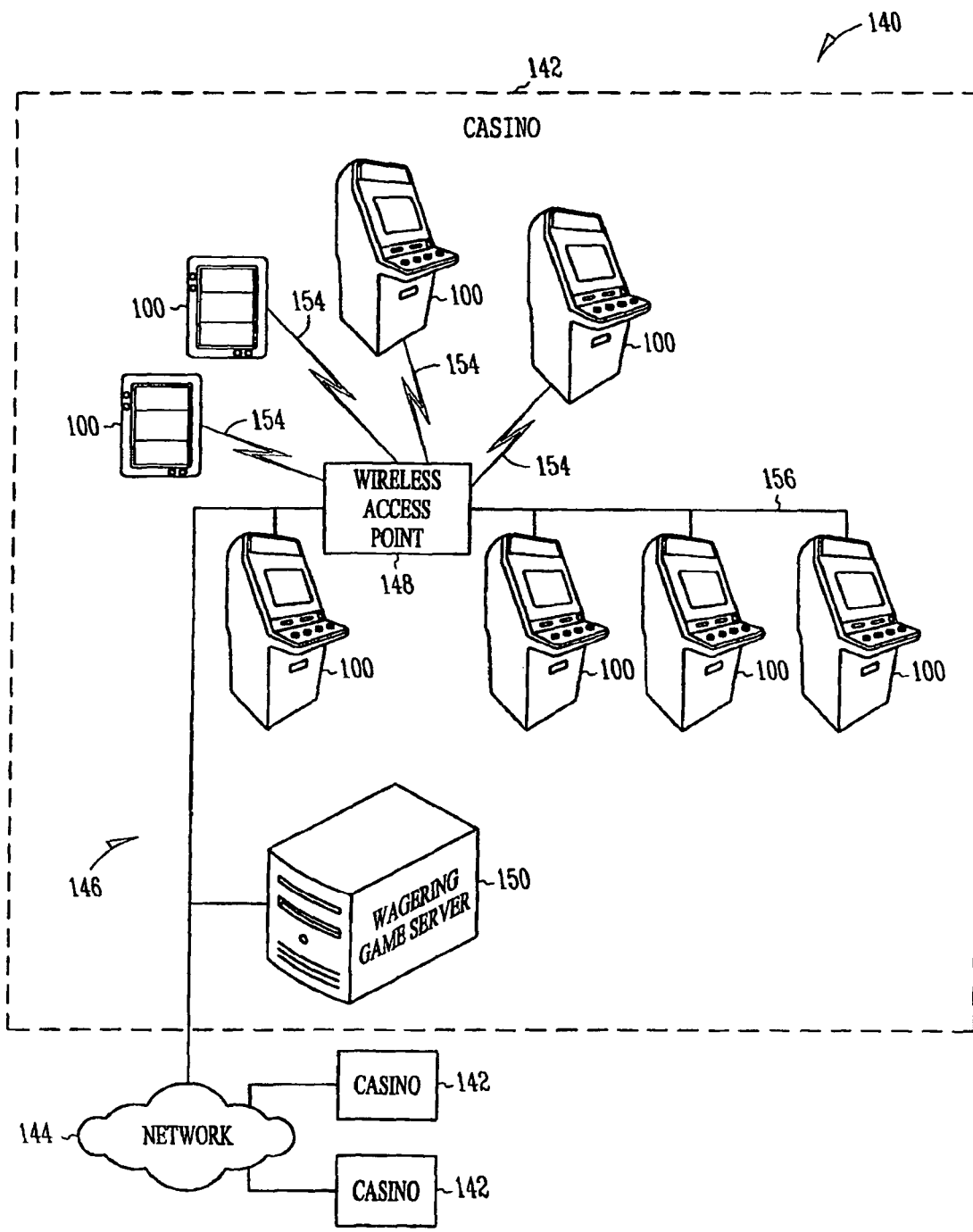
FIG. 1C illustrates a plurality of wagering game machines connected in a wagering game network according to one example embodiment of the inventive subject matter described herein.

Referring now to FIG. 1C there is illustrated an example embodiment of how a plurality of wagering game machines 100 can be connected in a wagering game network 140. FIG. 1C is a block diagram illustrating a wagering game network 140, according to example embodiments of the inventive subject matter described herein. The wagering game network 140 includes a plurality of casinos 142 connected to a communications network 144. Each of the plurality of casinos 142 includes a local area network 146, which includes a wireless access point 148, wagering game machines 100, and a wagering game server 150 that can serve wagering games over the local area network 146. As such, the local area network 146 includes wireless communication links 154 and wired communication links 156. The wired and wireless communication links 154, 156 can employ any suitable connection technology, such as Bluetooth, 802.11, Ethernet, public switched telephone networks, SONET, etc. In one embodiment, the wagering game server can serve wagering games and/or distribute content to devices located in other casinos 142 or at other locations on the network 144. Thus, the wagering game machines 100 and wagering game server 150 can include hardware and machine-readable media including instructions for performing the operations described herein.

The wagering game machines 100 described herein can take any suitable form, such as floor standing models, handheld mobile units, bar-top models, workstation-type console models, etc. Further, the wagering game machines 100 can be primarily dedicated for use in conducting wagering games, or can include non-dedicated devices, such as mobile phones, personal digital assistants, personal computers, etc. In one embodiment, the wagering game network 140 can include other network devices, such as accounting servers, wide area progressive servers, player tracking servers, and/or other devices suitable for use in connection with embodiments of the inventive subject matter. In other embodiments, any of the wagering game machines 100 can take the form of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

Figure 1D:
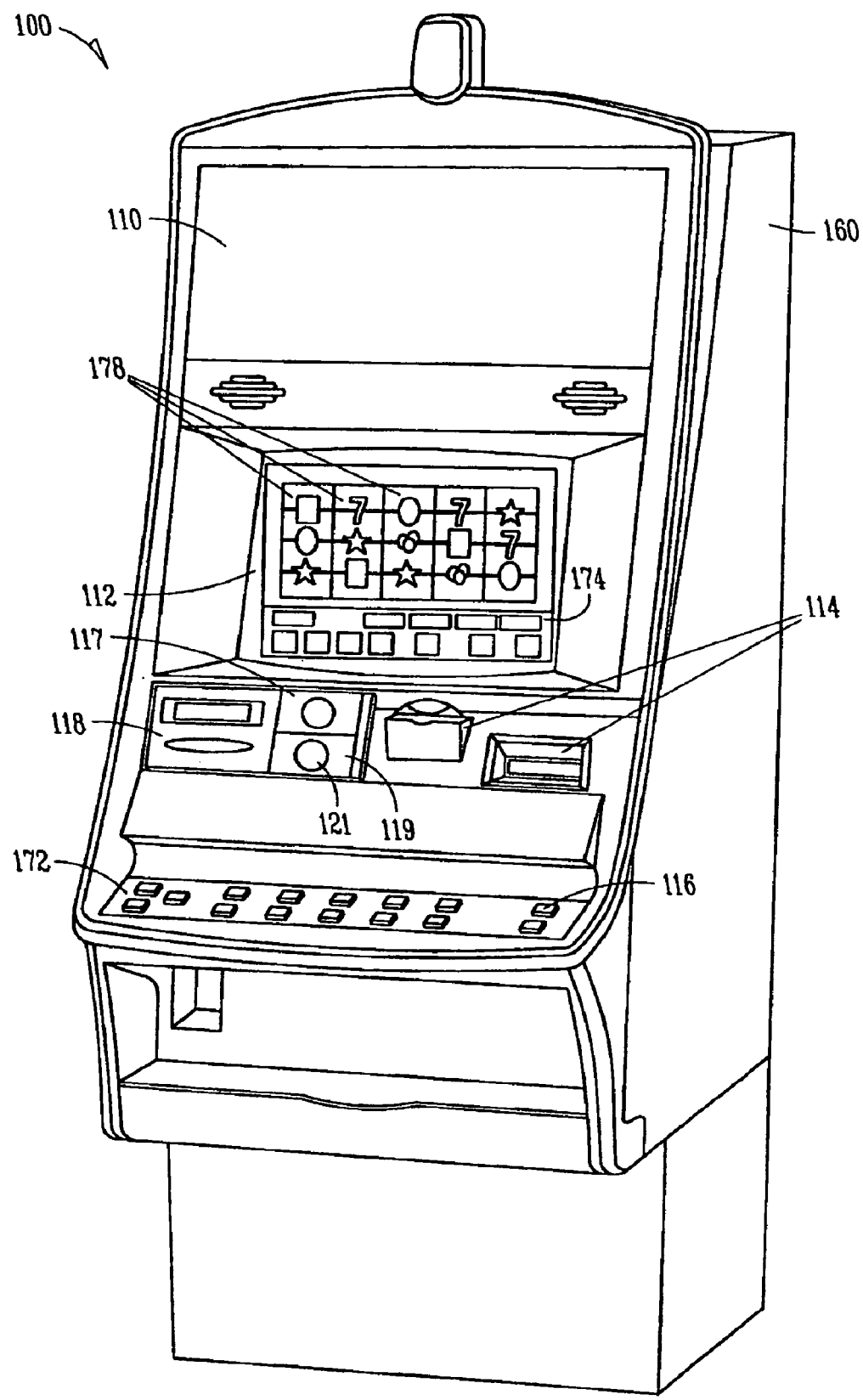
FIG. 1D illustrates a perspective view of the cabinet and exterior aspects of a wagering game machine according to one example embodiment of the inventive subject matter described herein.

Referring now to FIG. 1D, there is illustrated a perspective view of the cabinet and exterior aspects of a wagering game machine 100, according to example embodiments of the inventive subject matter. The wagering game machine 100 comprises a housing 160 and includes input devices, including value input devices 114 and a player input device 116. For output, the wagering game machine 100 includes a primary display 110 for displaying information about a basic wagering game. The primary display 110 can also display information about a bonus wagering game and a progressive wagering game. The wagering game machine 100 also includes a secondary display 112 for displaying wagering game events, wagering game outcomes, and/or signage information. While some components of the-wagering game machine 100 are described herein, numerous other elements can exist and can be used in any number or combination to create varying forms of the wagering game machine 100.

The value input devices 114 can take any suitable form and can be located on the front of the housing 160. The value input devices 114 can receive currency and/or credits inserted by a player. The value input devices 114 can include coin acceptors for receiving coin currency and bill acceptors for receiving paper currency. Furthermore, the value input devices 114 can include ticket readers or barcode scanners for reading information stored on vouchers, cards, or other tangible portable storage devices. The vouchers or cards can authorize access to central accounts, which can transfer money to the wagering game machine 100. The EDS media dispenser 117 includes, in one example embodiment, an inventory of portable storage media devices that can be dispensed to a player, and in at least one example embodiment, may include structure and function suitable to perform any of the operations described herein elsewhere. In addition, the EDS media reader/writer 119 is positioned such that at read/write "head" area 121 is positioned so as to allow a player to position a EDS media device (not shown) close enough to perform read or write operations:

The player input device 116 comprises a plurality of push buttons on a button panel 172 for operating the wagering game machine 100. In addition, or alternatively, the player input device 116 can comprise a touch screen 174 mounted in close proximity to the primary display 110 and/or secondary display 112. The various components of the wagering game machine 100 can be connected directly to, or contained within, the housing 160. Alternatively, some of the wagering game machine's components can be located outside of the housing 160, while being communicatively coupled with the wagering game machine 100 using any suitable wired or wireless communication technology.

The operation of the basic wagering game can be displayed to the player on the primary display 110. The primary display 110 can also display a bonus game associated with the basic wagering game. The primary display 110 can include a cathode ray tube (CRT), a high resolution liquid crystal display (LCD), a plasma display, light emitting diodes (LEDs), or any other type of display suitable for use in the wagering game machine 100. Alternatively, the primary display 110 can include a number of mechanical reels to display the outcome. In FIG. 1D, the wagering game machine 100 is an "upright" version in which the primary display 110 is oriented vertically relative to the player. Alternatively, the wagering game machine can be a "slant-top" version in which the primary display 110 is slanted at about a thirty-degree angle toward the player of the wagering game machine 100. In yet another embodiment, the wagering game machine 100 can exhibit any suitable form factor, such as a free standing model, bar-top model, mobile handheld model, or workstation console model.

A player begins playing a basic wagering game by making a wager via the value input device 114. The player can initiate play by using the player input device's buttons 172 or touch screen 174. The basic game can include arranging a plurality of symbols along a payline 178, which indicates one or more outcomes of the basic game. Such outcomes can be randomly selected in response to player input. At least one of the outcomes, which can include any variation or combination of symbols, can trigger a bonus game. In some embodiments, the wagering game machine 100 can also include an information reader 118, which can include a card reader, ticket reader, bar code scanner, RFID transceiver, or computer readable storage medium interface. In some embodiments, the information reader 118 can be used to award complimentary services, restore game assets, track player habits, etc.

In various embodiments described herein, image files may be used as a virtual storage device, such as a virtual compact flash device or a virtual hard drive. One or more image files may be mounted as though they were a normal block device. Operating system files, game files, or other configuration or security data may be stored on one or more image files. In embodiments, image files may be stored on various physical read-only or read/write storage media. One or more image files may also be stored in volatile or non-volatile memory in embodiments. For example, image files may be stored on a hard drive, a mini-hard drive, a hybrid hard drive (HHD), a CD-ROM, a DVD disk, an optical disk, a floppy disk, a compact flash card, a Memory Stick by Sony, a Secure Digital card, an xD card, a USB card, or other removable flash memory card format. Image files may also be stored as a file within a file system. Examples of file systems include NTFS, FAT32, and vFAT on Windows-based machines; ext3, ext2, and reiserFS on Linux-based machines; and ISO-9660 FS on CDs or DVDs. While portions of the description contained herein refer to a CF image format, other image formats may be used in addition to or in conjunction with the examples and embodiments described. For example, an image may represent the physical format of a hard drive, a compact flash storage device, a CD-ROM storage medium, a USB storage device, or other forms of storage devices or storage mediums.

Figure 2A:
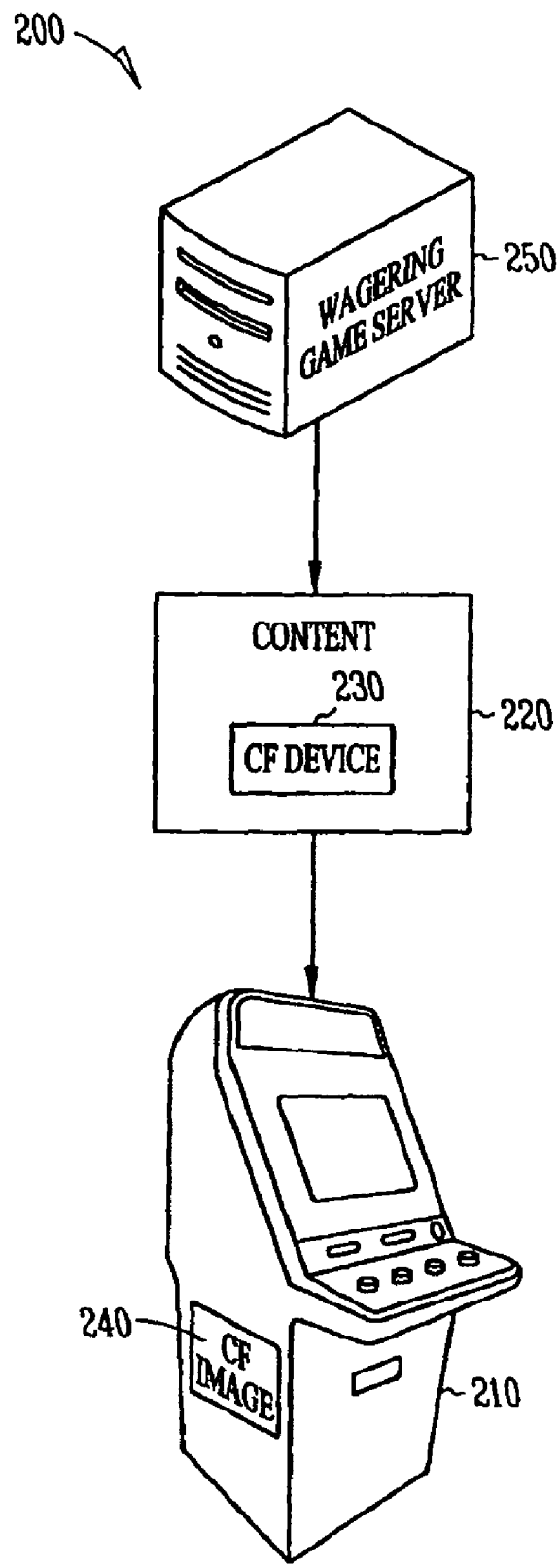
FIGS. 2A-2D illustrate methods of using a virtual read-only compact flash (CF) device in a network-based gaming environment according to example embodiments of the inventive subject matter described herein.

Referring now to FIG. 2A there is illustrated a schematic block diagram 200 of a first example embodiment of a network-based gaming method using a virtual read-only compact flash (CF) device according to the inventive subject matter disclosed herein. According to this embodiment, game and operating system (OS) content 220 is downloaded from a server 250, such as server 150, to the wagering game machine 210, such as the wagering game machine 100. Content 220 is downloaded, according to one example embodiment, in the form of a virtual read-only CF device 230. Virtual read-only CF device 230 may provide a level of security that is comparable to an actual read-only CF device such as CF device 132 used with standalone wagering game machine 100. The OS (Operating System) and game content 220 may be stored using the same CF image 240 format, including, for example, a partition table, a file signature table, and digital signature standard (DSS) signatures.

Figure 2B:
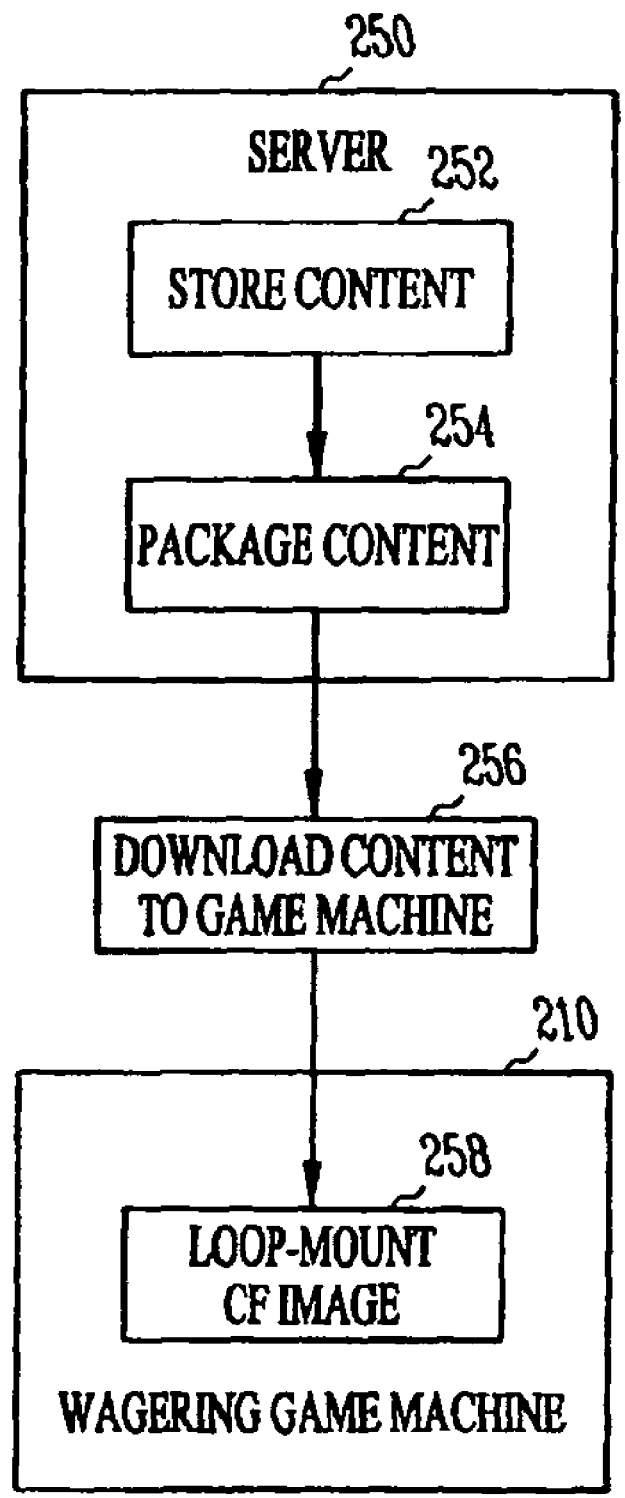

Referring to FIG. 2B, there is illustrated a method according to one example embodiment. Downloadable content, such as but not limited to content 220, is stored 252 on a server and is packaged 254 and downloaded 256 to a gaming machine, such as machine 100, as CF image files, for example a *.img file in the case of the UNIX or Linux OS. Further, according to one such embodiment, at least three types of packages may be supported for download, namely, but not limited to, games and game plug-ins, OS and peripheral firmware upgrades. Once the image is downloaded, it is loop-mounted 258. The process of loop mounting an image file includes transforming the image file into a virtual block device, which is similar to a disk drive or partition using a Linux loop driver, then mounting the virtual drive onto a mount point. According to one example embodiment, the directory structure within the image file stays intact while being used on the gaming machine, which may be accomplished, for example, by performing a read-only mount of the virtual drive, or using a read-only file system within the image file, such as ROMFS. Further, any required install/uninstall procedures/scripts may be packaged into the image files, and any/all common "asset" files that are common to a set of games (e.g., poker assets, or assets for an episodic game) may be packaged as a separate downloadable image file. According to one embodiment, the position of where the image file needs to be mounted may be factored into the name of the image file. Consequently, certain directories, such as a "/games" directory, may need to be positioned in a writable storage device on the gaming machine (such as RAMdisk), so that additional directories can be added (for mount points) to match the directories required by the image files. According to another example embodiment, a suitable mechanism may be adopted to ensure that games/episodes are compatible with a common "assets" image, if one is involved. Further, install and uninstall mechanisms may be built into the respective images.

Figure 2C:
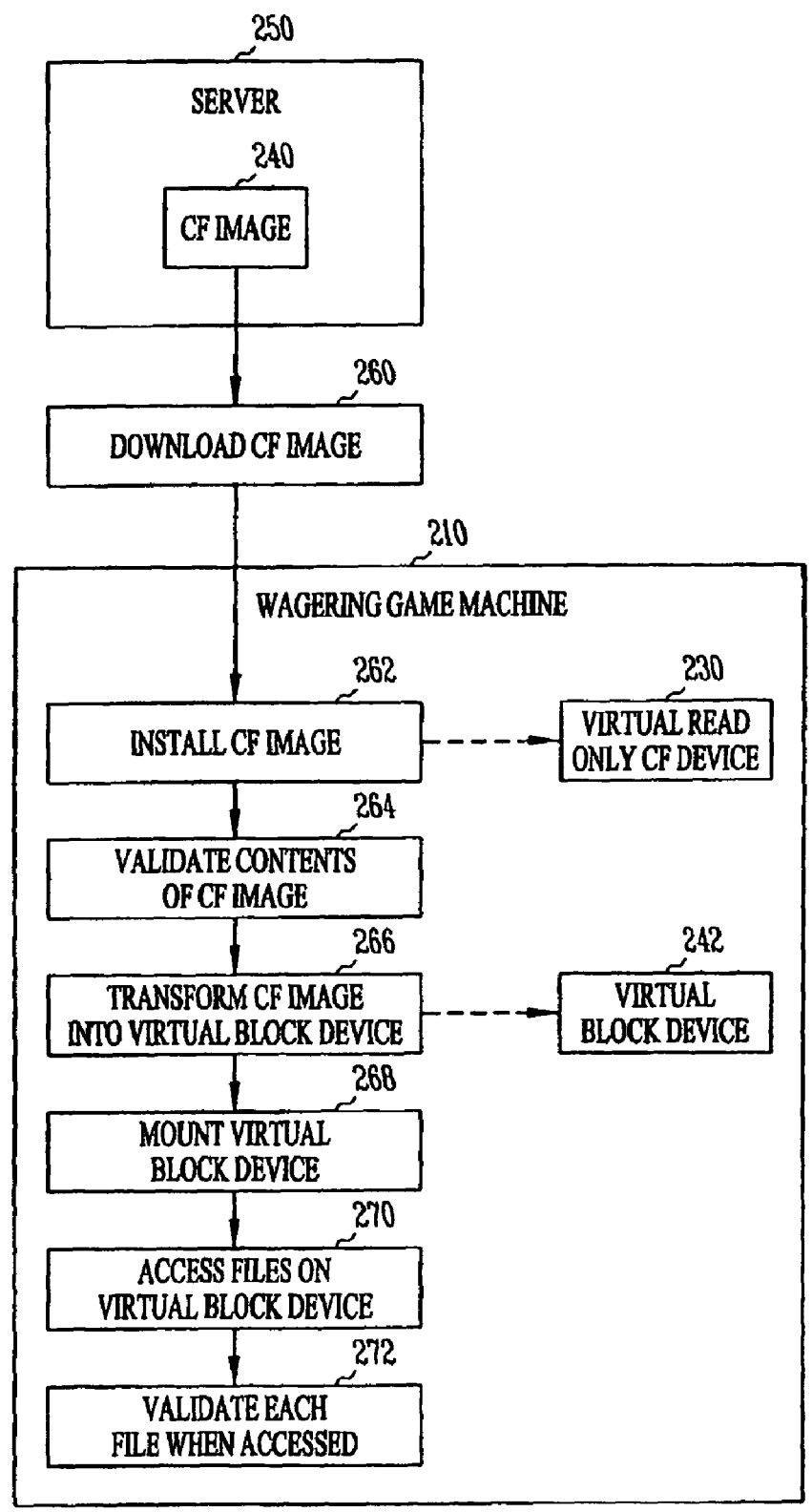

Referring to FIG. 2C, there is illustrated a method according to one example embodiment. The CF image 240 may be downloaded 260 and installed 262 on the wagering game machine 210, and validation 264 may be performed on the contents of the CF image 240, for example in the same way the content of a real CF device 132 is validated. The CF image 240 is transformed 266 into a virtual block device 242, for example to make the image look like a real CF device 132. In one example embodiment in a Linux OS environment, this transformation may be made using the Linux loop driver. The virtual block device 242 may be mounted 268, for example, the same way a partition of a real CF device 132 is mounted, and all files may be accessed 270 within the partition via the mount point. Validation of each file may be performed 272 upon the execution or opening of the files in the same fashion as they would be if they were resident on a real CF device such as device 132. According to one example embodiment, the above-described method and system may be used to download and install an unlimited number of virtual read-only CF devices 230 in a wagering game machine 210. This system and operation may provide for the installation and un-installation of virtual CF content on-line on a wagering game machine 210, without requiring a reboot, and for preserving the same level of security, as in a standalone wagering game machine 100 using a real CF device 132.

Figure 2D:
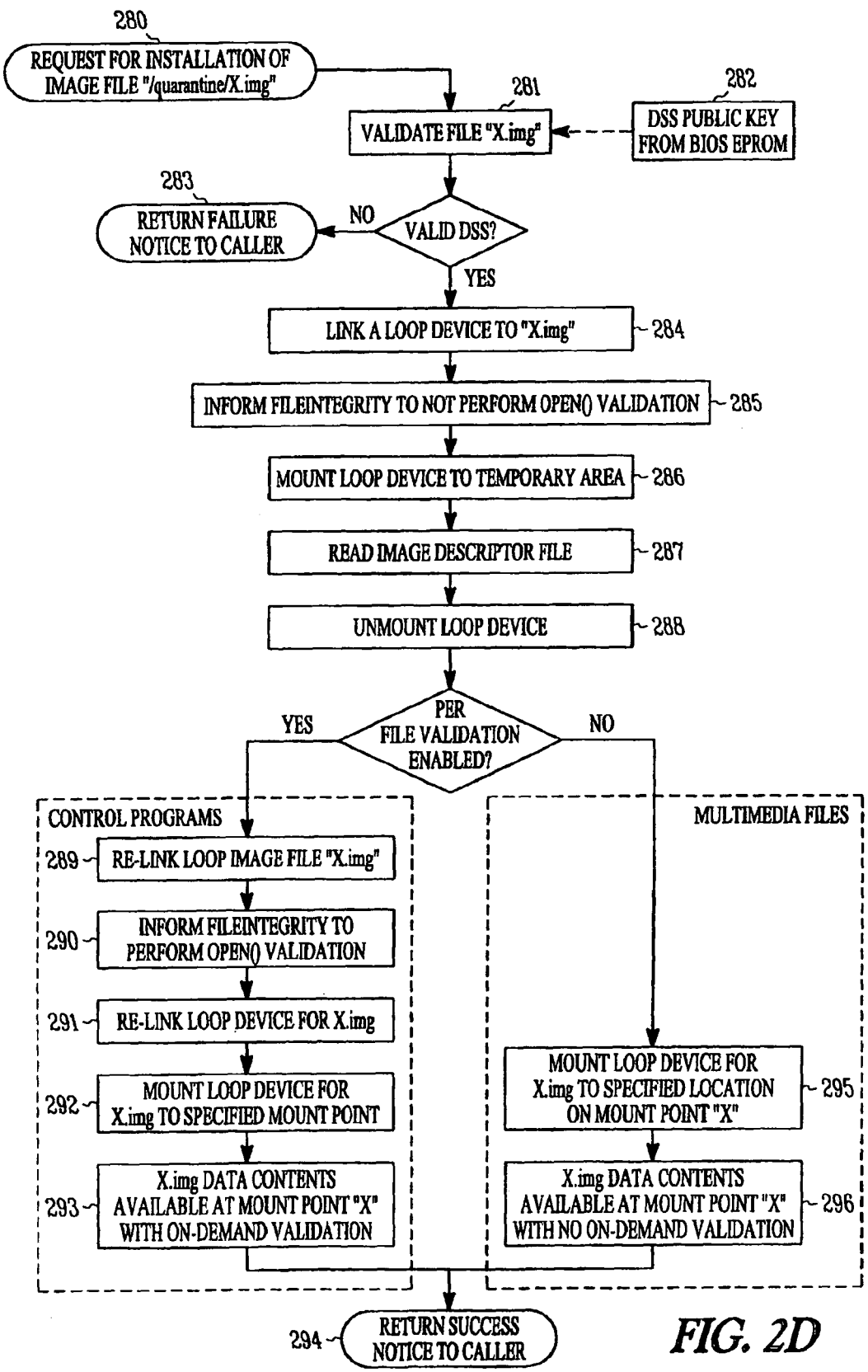

Referring to FIG. 2D, there is illustrated a method according to one example embodiment. After a request to install an image file is received 280, an image may be validated 281, for example by using a full image DSS signature. This may ensure that the image file is an authentic copy of a released product. In an embodiment, a DSS public key 282 stored in a BIOS EPROM is used. If the validate step 281 fails, then the a failure notice is issued 283. Otherwise, the image file is mounted 284, for example by using a loop device mechanism. In an embodiment, a loop device is linked to the image file such that the loop device is pointed to the start of a content partition within the image. The initial positioning is used to access an image descriptor file stored at the beginning of the content partition. In another embodiment, the loop device is linked and pointed to a particular location or offset within the content partition of the image file to access an image descriptor file stored at a known location. The image descriptor file may contain data related to where and how the image file should be ultimately installed or used by the wagering game machine. For example, mount points or file validation modes may be included in the image descriptor file. File level verification is temporarily disabled 285. For example, a file-integrity kernel module is instructed to not perform open ( ) system call file verification for the loop device in order read the trusted image descriptor file. The image is mounted 286 to a temporary mount point, after which the image descriptor file is accessed 287 and one or more parameters stored in the file are accessed. Parameters may include a specified mount point, a per-file validation flag, or other data to control file validation, or mounting or linking a loop device. The image descriptor file may then be closed and the image is unmounted 288.

One parameter that may exist in the image descriptor file is a per-file validation flag. When the per-file validation flag is indicated as being enabled, then files opened from the image are validated, for example, by using a kernel-level operation to trap an open ( ) system call file and validate the authenticity or integrity of the file being opened. In an embodiment, some files, such as control program files, may be selected to be validated when opened while other files, such as multimedia files, may not need to be validated.

If the image descriptor file includes an indication to enable the per-file validation, then the image is re-linked 289 to a loop device. The file-integrity kernel module is instructed 290 to perform open ( ) system call file verification for the loop device. In an embodiment, to enable the open ( ) system call file verification for the loop device, the file-integrity kernel module is instructed to load a file signature table (FST) for the loop device and to associate the FST with a major, minor number of the loop device. In an embodiment, each entry in the FST corresponds with a file in a partition of the image and is indexed using the file's inode number and contains a digital signature (e.g., DSS from SHA-1) using the file data and its full path. The image may then be re-linked 291 to a loop device to point to the start of a data partition of the image file. The loop device may then be mounted 292 to a mount point specified in the image descriptor file. After the re-linking and mounting, the image file may be accessed 293 at the mount point with on-demand validation activated. If steps 289-293 perform without raising an error, then a success notice is returned 294.

If the image descriptor file include an indication to disable the per-file validation, or to not enable it, then the image is mounted 295 to a mount point, which may be specified in the image descriptor file. The contents of the image file may then be accessed 296 at the mount point with no on-demand file validation. If steps 295 and 296 perform without raising an error, then a success notice is returned at 294.

Figure 3A:
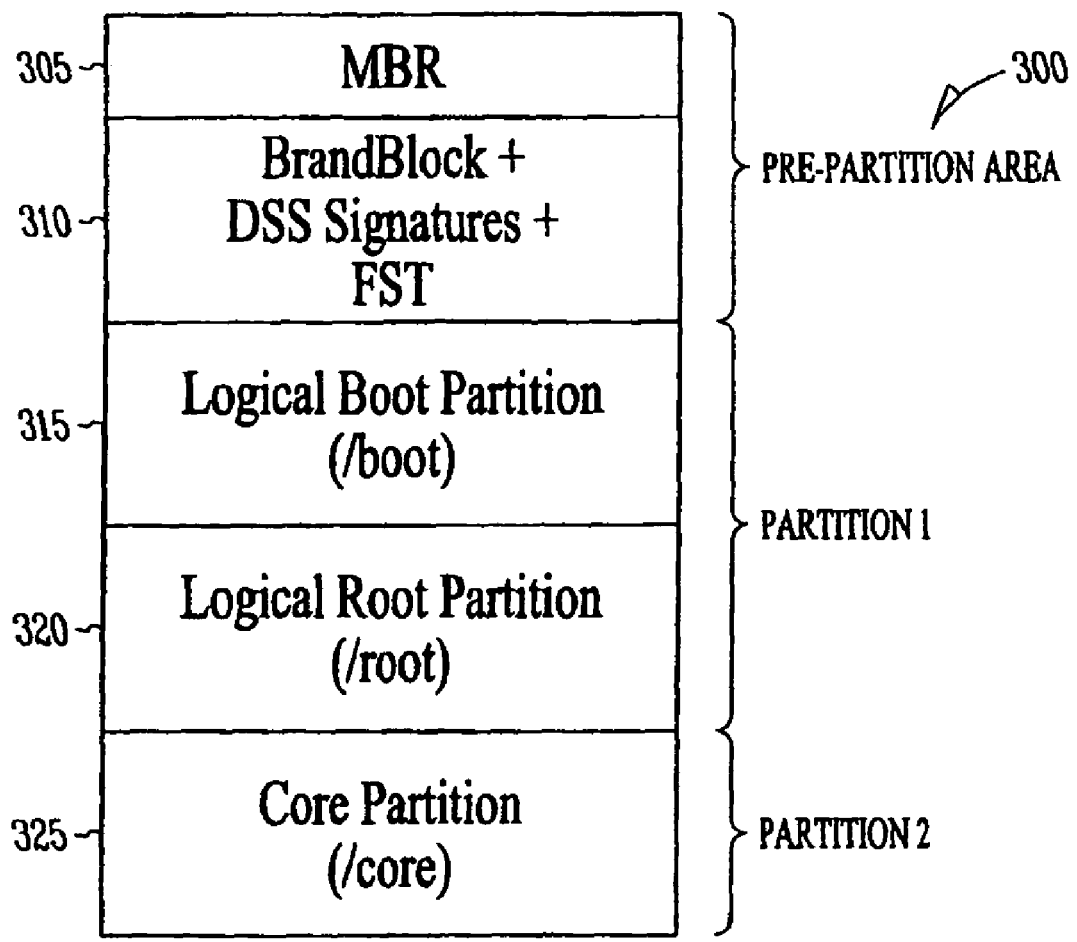
FIGS. 3A-3C illustrate block diagrams of CF image file structures according to example embodiments of the inventive subject matter described herein.
Figure 3B:
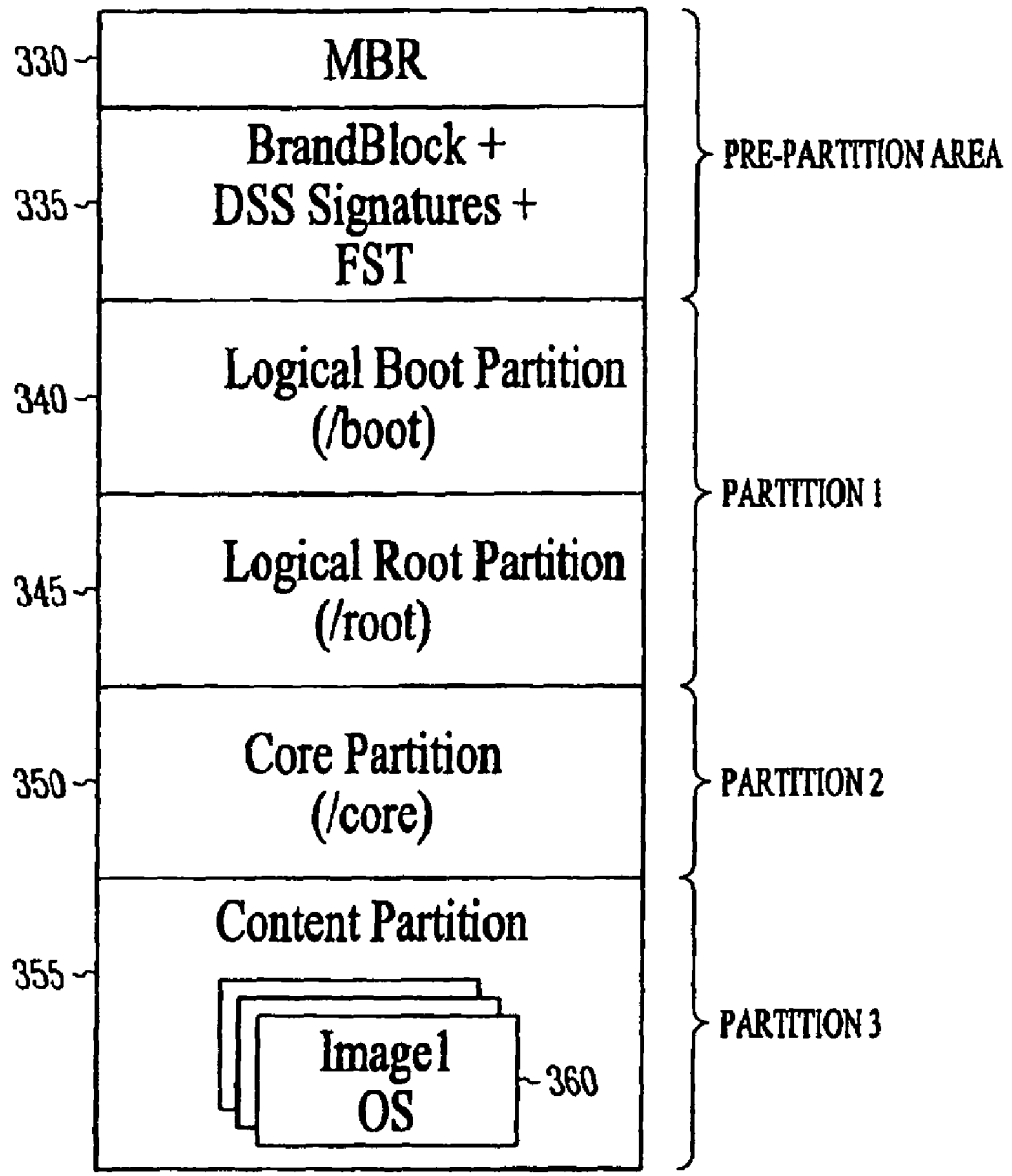
Figure 3C:
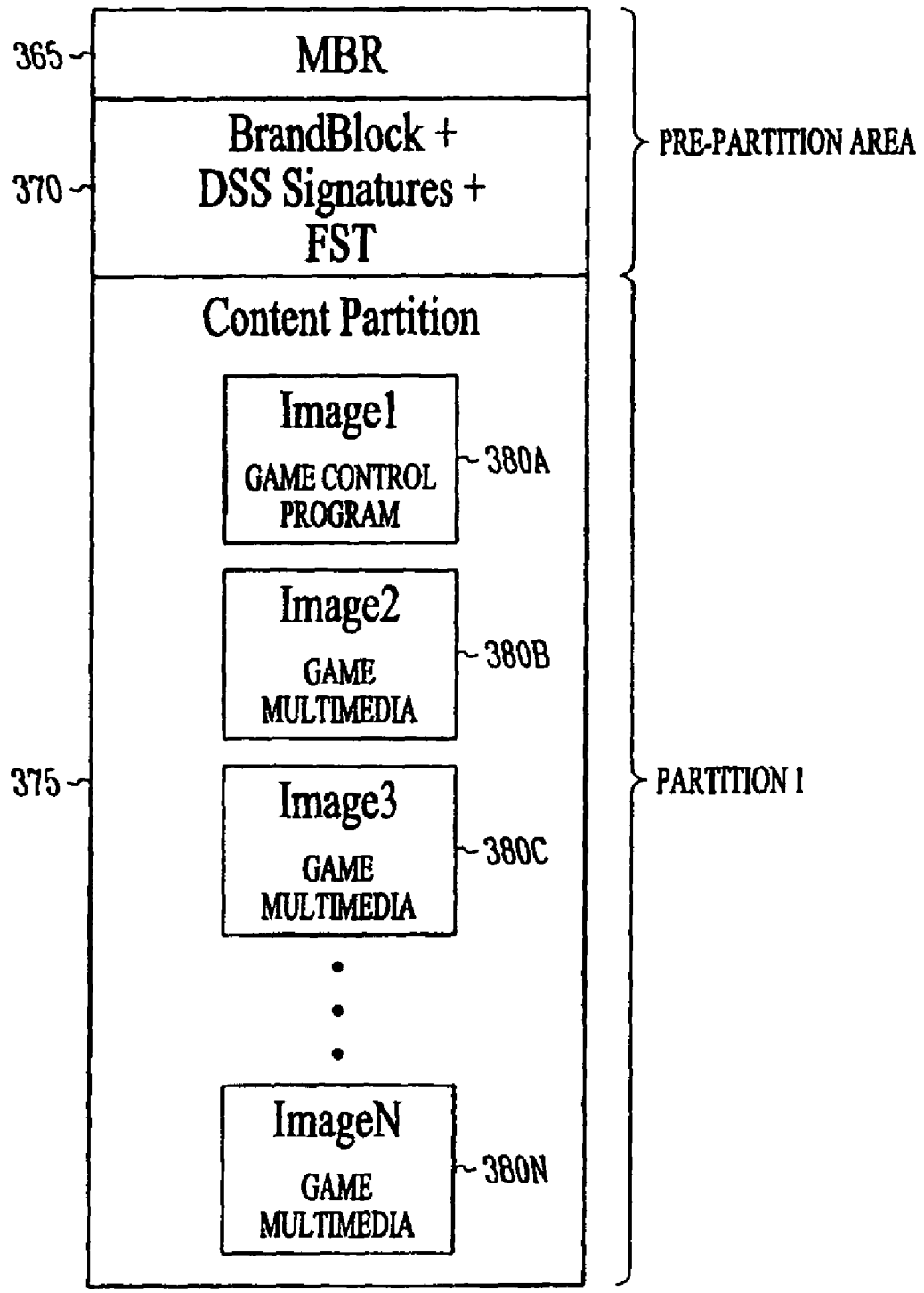

FIGS. 3A-3C illustrate block diagrams of CF image file structures according to example embodiments. Referring to FIG. 3A, an example of an image file format is illustrated. The image format includes a pre-partition area 300, which includes a master boot record (MBR) sector 305 (typically the first block of a hard drive image or at some specific offset in a CF image) and a brand block sector 310. In an embodiment, the brand block sector 310 includes operating system version data, one or more DSS signatures for one or more pre-partitions or partitions of the CF image, a whole device DSS signature, and a file signature table (FST). Partition 1 includes a logical boot partition 315 and a logical root partition 320. In an embodiment, the logical boot partition 315 includes a Linux boot partition. In an embodiment, the logical boot partition 315 is mounted to "/boot" and the logical root partition is mounted to "/root." Partition 2 includes a core partition 320. The core partition 320 includes system files and software, such as scripts, libraries, and executables that provide daemons, services, or other operating system configuration support. In an embodiment, the core partition 320 is mounted to "/core."

Referring to FIG. 3B, an example of an image file format is illustrated. Similar to the file format illustrated in FIG. 3A, the image file format illustrated in FIG. 3B includes an MBR sector 330, a brand block sector 335, two logical partitions—a logical boot partition 340 and a logical root partition 345—and a core partition 350. In addition, a content partition 355 is included. The content partition 355 can include one or more image files 360. Image files 360 may be organized using a structure, such as one illustrated in FIG. 3A or FIG. 3B. In an embodiment, recursively nested image files may be nested to N levels, and may be only limited by the amount of storage space available on the physical storage medium.

Referring to FIG. 3C, an example of an image file format is illustrated. Similar to the file formats illustrated in FIG. 3A and FIG. 3B, the image file format illustrated in FIG. 3C includes an MBR sector 365 and a brand block sector 370. In place of the operating system partitions found in the formats illustrated in FIGS. 3A and 3B, Partition 1 is wholly used as a content partition 370. The content partition 375 can include one or more image files 380A, 380B, 380C, . . . , 380N. In the example illustrated, image file "Image1" 380A includes a game control program, which may be used to present, manage, or operate a wagering game on a wagering game machine. Image files "Image2" 380B, "Image3" 380C, and "ImageN" 380N include game multimedia data, which may be used to present a user-interface, game assets, interface sounds, or other multimedia-oriented aspects of operation in a wagering game machine. Image files 380 may be organized using a structure, such as one illustrated in FIG. 3A, FIG. 3B or FIG. 3C. In an embodiment, recursively nested image files may be nested to M levels, and may be only limited by the amount of storage space available on the physical storage medium.

Figure 4:
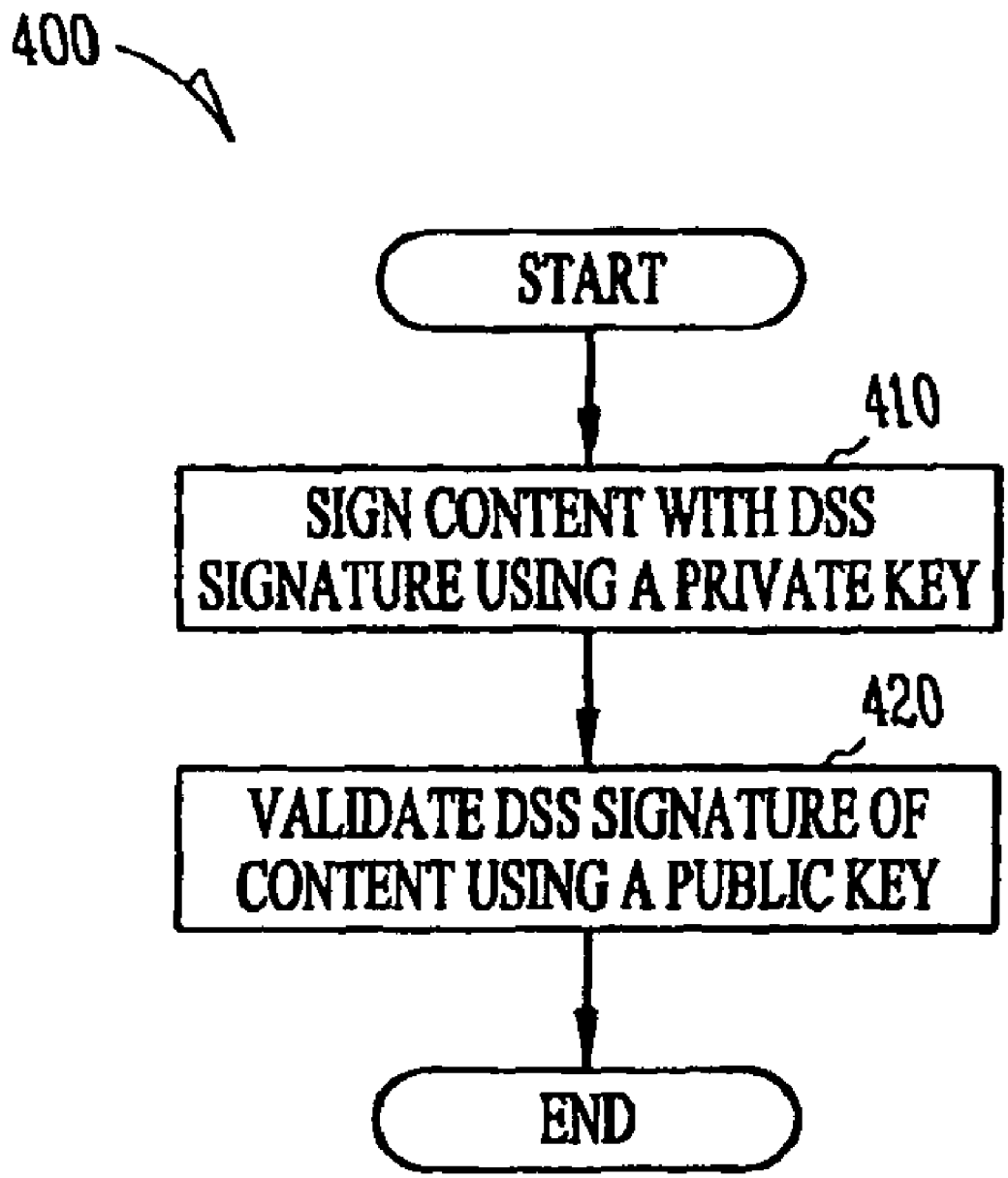
FIG. 4 illustrates a method for providing a security architecture for an electronic gaming machine according to example embodiments of the inventive subject matter described herein.

According to one example embodiment 400 illustrated in FIG. 4, a security architecture method for an electronic gaming machine uses authentication of software content, such as content 220, by signing 410 the content with a DSS signature using a private key (encrypted for example with a SHA1 digest value, wherein SHA1 is part of the Secure Hash Algorithm family), and validation 420 of the DSS signature for the content against the a public key corresponding to the private key, wherein the public key may be issued by the entity signing the content. According to this example embodiment, any content that has its SHA1 digest value signed with the private key will pass verification using the public key, thereby proving that the content is legitimate.

Figure 5:
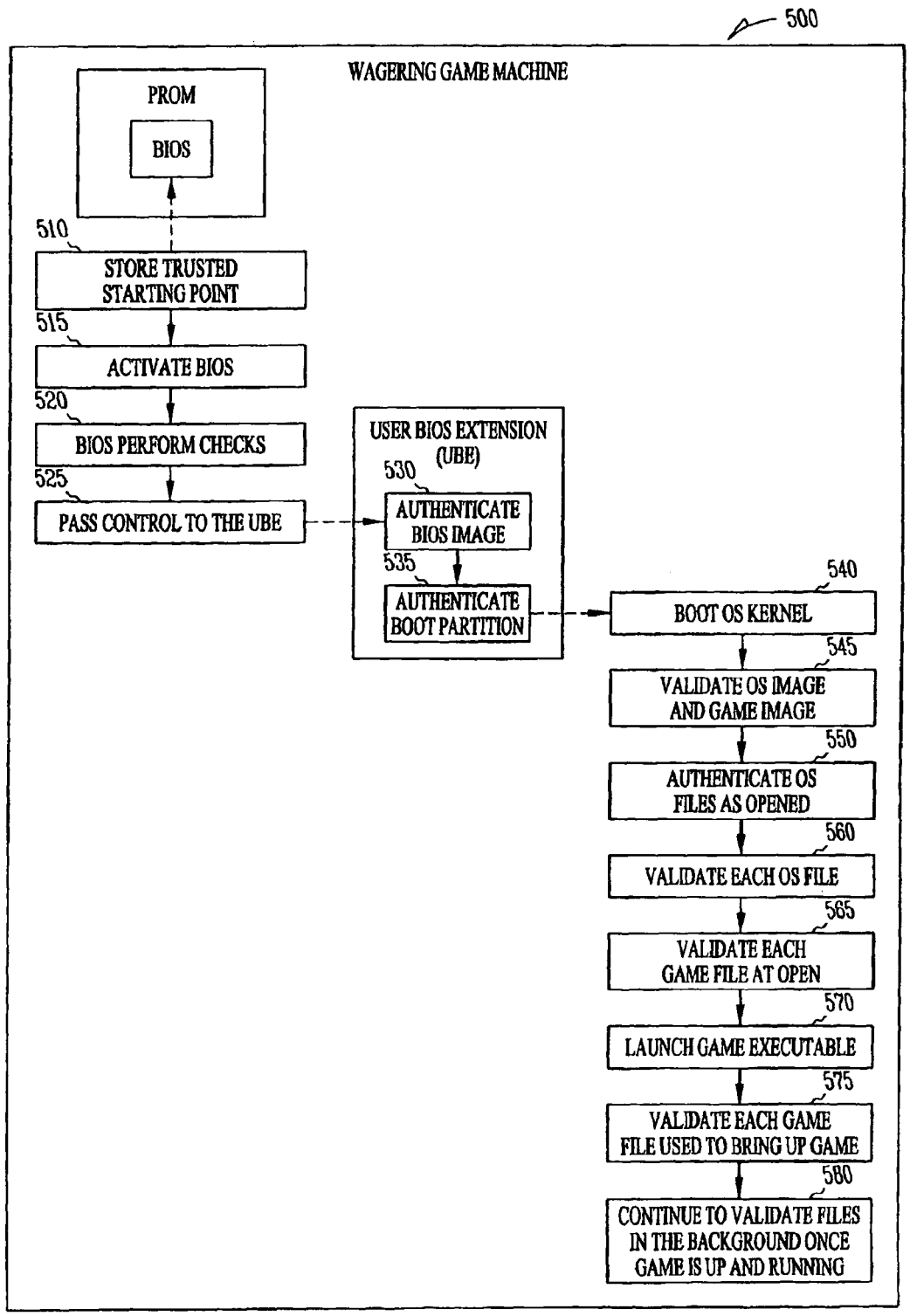
FIG. 5 illustrates a security architecture according to example embodiments of the inventive subject matter described herein.

Referring now to FIG. 5, there is illustrated an example embodiment of a security architecture 500 according to an example embodiment of the inventive subject matter, wherein the architecture is used on a gaming machine using the Linux OS. A trusted starting point for the security architecture for a gaming machine is a BIOS stored 510, for example, on a PROM such as EEPROM 121 illustrated with respect to wagering game machine 100. Starting from the BIOS, the circle of trust is expanded to include other content as follows. After the BIOS is booted 515, it performs 520 basic system sanity tests and passes 525 control to a user BIOS extension (UBE). The UBE performs two validations, using a public key stored within the BIOS image, including authenticating 530 the BIOS image. This certifies that the BIOS itself is an officially signed copy released by the authorized entity. In addition, the UBE authenticates 535 the boot partition on the mass storage device (for example partition 3 in some systems) used on the wagering game machine. This certifies that the OS kernel is the same as the official copy released by the authorized entity. At this point, the BIOS is ready to boot 540 the OS kernel. At the conclusion of this step, the BIOS and the boot partition are considered "trusted" content.

Next, the OS image on the read-only CF and the game image on the read-only CF are validated 545. In one embodiment, after the OS kernel boots, it mounts the root partition (partition 2) and the "init" process starts executing a rc.sysinit script. According to one example embodiment, if open( )/exec( ) time validation is already in effect, the rc.sysinit file becomes a trusted object prior to its execution. The open( ) time file validation is described below. This script may kick off two foreground validate processes that read and validate the OS image and the game image. After the two validate processes complete successfully, the OS image and game image content are considered trusted content.

The OS files from the OS image are then authenticated 550 when opened, for example using the open( ) function. For this purpose, the rc.sysinit script continues booting the rest of the system, bringing up the OS processes and loading kernel modules. As it does so, the kernel validates 560 each file that is either open( )-ed or exec( )ed, incrementally expanding the circle of trust to every file that goes into active use as part of the boot process. In addition, the game files are authenticated 565 at open( ). In the final step of the boot process, the game executable from the game image is launched 570. Again, using the kernel per-file authentication 575, the circle of trust expands to all game files actively used to bring up the game. Further validation 580 is performed continuously in the background. This is accomplished with four background validation processes that are launched to ensure that the content: OS image, game image, BIOS EEPROM, and the Serial Peripheral Interface (SPI) EEPROM are valid and stay valid while the game is in operation.

Figure 6:
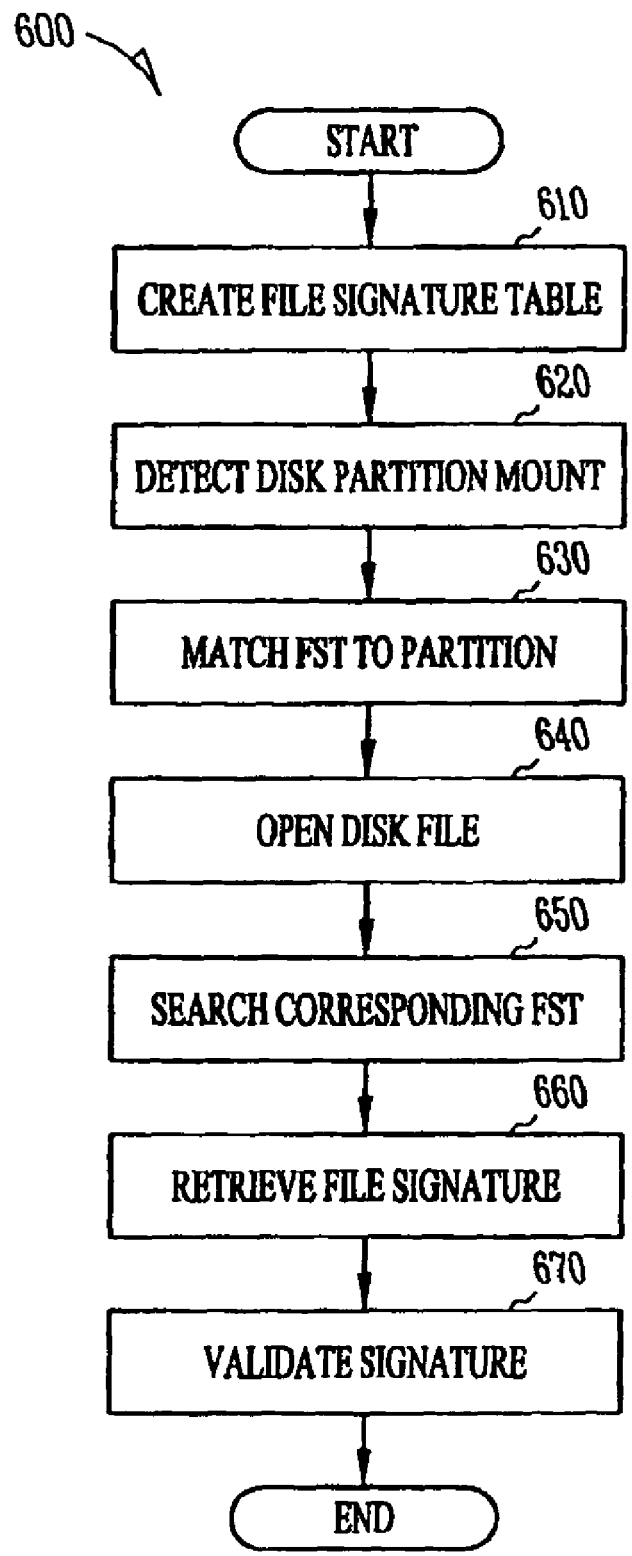
FIG. 6 illustrates a method for validating files read from a virtual read-only CF device according to example embodiments of the inventive subject matter described herein.

According to one example embodiment 600, the validation of files is accomplished during opening or executing the files, for example using the Linux OS, as illustrated in FIG. 6. During imaging of the OS or game image, a file signature table (FST) is created 610 for each partition in the virtual read-only CF image. Each entry in the FST corresponds to a file in the partition, created by generating an encrypted hash (DSS from a SHA1) over the file data and its full pathname, then stored in the FST, indexed by the file's inode number. The OS kernel uses the FST that is loaded by the kernel during kernel boot, specifically when the integrated drive electronics (IDE) drives are configured for the host wagering game machine. In one example kernel, this may be modified such that FST loading is done during the loading (insmod) of the file-validation kernel module. When a disk partition is mounted 620, the FST for this partition is located by matching 630 it up with the device major and minor numbers. Consequently, when a disk file is open( )-ed 640, the corresponding FST is located, then searched 650 for the file's disk-based inode number, and the file's signature is retrieved 660. This signature is then validated 670 by performing a SHA1 over the file data and pathname, then running an algorithm to validate the signature, using the public key stored in the BIOS ROM. Further, according to still another example embodiment, the file validation mechanism may require that the kernel successfully locates the right FST for the file system where the file resides. Further, the inode number of the file may need to be determined at FS image creation time, so that the FST can be built and indexed with the inode number. This number may be used to retrieve the file signature from FST at open( ) time. Moreover, the full pathname of the file, as it would appear on the target, may be incorporated into the SHA1, which is then encrypted with the authorized entity's private key to yield the file's DSS signature. Hence, the pathname of the file on the target must match the assumed pathname of the file at imaging/signing time. According to another example embodiment, this requirement may be taken out by modifying the imaging/validation procedure used by the kernel.

Thus, according to this system and method, there may be dynamically commissioned a variable number of virtual, read-only compact flash devices onto a wagering game machine from a server. Moreover, this system and method may be implemented by modifying validation mechanisms that exist on stand-alone wagering game machines such as machine 100 described above, allowing the downloaded images to be validated using techniques that are the same or similar to stand-alone machines, with the same level of security such stand-alone machines enjoy.

Thus, according the example embodiments described herein, the files comprising downloadable game content may be delivered (e.g., downloaded), in the context of a Linux OS, as a file system (FS) image, where the file inode numbers are pre-determined at imaging time. After reaching the target wagering game machine, this image may be mounted by the OS kernel to enable access to individual files. The packaging mechanism for a downloadable component may use the existing imaging mechanism used for generating images for stand-alone machines, generating a game binary (<game>.bin) and game signature (<game>.sig) file. After signing, the <game>.img file may be generated. Instead of being burnt onto a real CF device and physically placed in the wagering game machine, the <game>.img file may be downloaded from a gaming server to the wagering game machine and automatically stored thereon. In addition, the associated FST may be extracted from the <game>.img file and loaded into the file-validation kernel module (e.g., via a supported ioctl( )), prior to mounting the FS image. The new image may then be stored on a write-able portion of the wagering game machines hard drive, and "loop" mounted, via the /dev/loop<n> device. According to one example embodiment, the Linux OS supports a block device driver, /dev/loop<i>, which makes a disk file appear to be a block device.

According to another example embodiment, if the disk file contains a file system (filesystem) image, the loop driver can be used to mount the file system contained in a disk file. A suitable mechanism may be provided to link the loop device to the corresponding FST. If the loop device's major/minor number works, then that could be used. The validation of files at file open( ) time will be identical to the mechanism used for validation of files from a real CF device, once the FST for the new image file has been loaded into the kernel's file integrity module. An existing "validate" process used to validate the entire image for OS or game CF for a stand-alone game may also be used to validate the downloadable game image(s). According to another example embodiment, if individual file validation is not a requirement for downloadable games, this mechanism may be adapted such that only the full image validation is done, and per file validation is skipped. In addition, prior to mounting the game using the loop device, the <game>.img file may be validated (entire image), using the validate program.

The systems and methods described above have been presented in part using the Linux operating system as an example operating system. Those of skill in the art will appreciate that the systems and methods described above may be adapted to various versions of the UNIX operating system, and to other non-UNIX operating systems as well. The inventive subject matter is not limited to any particular operating system.

Thus, there has been described above system, method and software for server-based gaming wherein, in one example embodiment, a virtual read-only compact flash device is used to download content including operating system and game components to a client wagering game machine, and for installing and using the content on the client wagering game machine so that it can be validated and trusted. Further the system and method provides for installing and uninstalling virtual compact flash content on-line on a wagering game machine without requiring a reboot of the wagering game machine, while preserving the same level of security as a standalone wagering game machine wherein content may be physically installed.

The invention claimed is:

1. A wagering game machine comprising:
   at least one processor;
   at least one wager input software component operative on the at least one processor to receive a wager indication from a player; and
   one or more additional software components operative on the at least one processor to:
      download and install a storage device image containing wagering game content;
      validate the storage device image;
      transform the storage device image so that it is stored on a virtual storage device;
      mount the storage device image from the virtual storage device;
      access files within the storage device image from the mounting point; and
      validate the files in a manner as the files would be validated if they were resident on the wagering game machine in a physical storage device;
   wherein the storage device image includes at least one of: a partition table, a file signature table, or DSS signatures; and
   wherein a loop driver is used to transform the storage device image into a virtual device, and the virtual device is a block device.

2. A wagering game machine according to claim 1, wherein the validation of the files is performed upon opening or executing the files.

3. A wagering game machine according to claim 1, including using an image format for content on the storage device image as would be used if the content was stored on a read-only storage device and physically brought to the wagering game machine.

4. A wagering game machine according to claim 3, wherein the content includes at least one of an operating system or game content.

5. A method comprising:
   downloading and installing a storage device image of wagering game content on a wagering game machine, wherein the wagering game machine is capable of receiving a wager input from a player;
   performing validation of the storage device image;
   transforming the storage device image so that it appears to be a physical storage device, to provide a virtual storage device containing the storage device image;
   mounting the virtual storage device at a mounting point;
   accessing files within the virtual storage device from the mounting point; and
   validating the files;
   wherein the storage device image includes at least one of: a partition table, a file signature table, DSS signatures, or a second storage device image; and
   wherein a loop driver is used to transform the storage device image into a virtual device, and the virtual device is a block device.

6. A method according to claim 5, wherein the validation of the files is performed upon opening or executing the files.

7. A method according to claim 5, further including using an image format for content on the storage device image as would be used if the content was stored on a physical storage device and physically brought to the wagering game machine.

8. A method according to claim 7, wherein the content includes at least one of an operating system or game content.

9. A method according to claim 5, wherein the second storage device image can contain one or more nested storage device images.

10. A non-transitory computer readable medium containing one or more computer programs, wherein when the one or more computer programs are executed on a computer platform, they perform the following operations:
- allow at least one player to input a wager;
- validate a storage device image stored on a virtual storage device; and
- mount the storage device image; and
- validate files contained in the storage device image,
- wherein the storage device image includes operating system and game content, and wherein the game content includes at least one partition table, at least one file signature table, and at least one DSS signature; and
- wherein a loop driver is used to transform the storage device image file into a virtual device, and the virtual device is a block device.

11. A method comprising:
- storing on a server a virtual read-only compact flash device, wherein the virtual read-only compact flash device includes an image having wagering game content; and
- downloading the virtual read-only compact flash device to a client wagering game capable of receiving a wagering indication from a player, the client wagering game installed on a wagering game machine, wherein the wagering game machine:
  - performs validation of the image on the virtual read-only compact flash device:
  - transforms the image so that it appears to be a physical storage device, to provide a virtual storage device containing the image;
  - mounts the virtual storage device at a mounting point;
  - accesses files within the virtual storage device from the mounting point; and
  - validates the files;
- wherein the image includes at least one of: a partition table, a file signature table, or DSS signatures; and
- wherein a loop driver is used to transform the image into a virtual device, and the virtual device is a block device.

12. A method according to claim 11, wherein the validation of the files is performed upon opening or executing the files.

13. A method according to claim 11, further including using an image format for content on the image as would be used if the content was stored on a physical storage device and physically brought to the wagering game machine.

14. A method according to claim 13, wherein the content includes at least one of an operating system or game content.

* * * * *